US008298446B2

(12) United States Patent
Sakuma et al.

(10) Patent No.: US 8,298,446 B2
(45) Date of Patent: Oct. 30, 2012

(54) VINYLIDENE FLUORIDE BASED POLYMER POWDER AND USE THEREOF

(75) Inventors: Mitsuyasu Sakuma, Tokyo (JP); Hiroshi Sato, Tokyo (JP); Michihisa Miyahara, Tokyo (JP); Katsuo Horie, Tokyo (JP); Hiroshi Sakabe, Tokyo (JP)

(73) Assignee: Kureha Corporation (JP)

( * ) Notice: Subject to any disclaimer, the term of this patent is extended or adjusted under 35 U.S.C. 154(b) by 376 days.

(21) Appl. No.: 12/682,451

(22) PCT Filed: Sep. 12, 2008

(86) PCT No.: PCT/JP2008/066927
§ 371 (c)(1),
(2), (4) Date: Apr. 9, 2010

(87) PCT Pub. No.: WO2009/047969
PCT Pub. Date: Apr. 16, 2009

(65) Prior Publication Data
US 2010/0270509 A1 Oct. 28, 2010

(30) Foreign Application Priority Data
Oct. 11, 2007 (JP) ................................. 2007-265228

(51) Int. Cl.
*H01B 1/24* (2006.01)
*C08F 2/18* (2006.01)
*C08F 14/22* (2006.01)
*H01M 4/04* (2006.01)

(52) U.S. Cl. ..................... 252/511; 429/218.1; 526/255; 525/199

(58) Field of Classification Search .................. 252/511; 429/218.1; 526/255; 525/199
See application file for complete search history.

(56) References Cited

U.S. PATENT DOCUMENTS

| 3,780,007 A | 12/1973 | Stallings |
| 4,524,194 A | 6/1985 | Dumoulin |
| 5,030,394 A * | 7/1991 | Sietses et al. .................. 264/28 |
| 5,145,921 A | 9/1992 | Lasson |
| 5,292,816 A | 3/1994 | Metz et al. |
| 5,776,637 A | 7/1998 | Kashio et al. |
| 2007/0082993 A1 | 4/2007 | Amin-Sanayei et al. |

(Continued)

FOREIGN PATENT DOCUMENTS
EP 0417585 A1 3/1991
(Continued)

OTHER PUBLICATIONS

European Search Report for Application No./Patent No. 08837924.3-1214/2196479 dated Oct. 25, 2010.

(Continued)

*Primary Examiner* — Mark Kopec
(74) *Attorney, Agent, or Firm* — Cantor Colburn LLP

(57) ABSTRACT

A method for producing a vinylidene fluoride based polymer powder having a high molecular weight and excellent solubility in an organic solvent, which is useful as an electrode binder for nonaqueous cells, is provided. Methods for producing an NMP solution and an electrode mixture are also provided.

A vinylidene fluoride based polymer powder produced by supercritical suspension polymerization in an aqueous dispersion medium wherein a volume of pores having a pore diameter of 0.03 µm to 1.0 µm, as measured by a mercury porosimeter, is 77 vol % to 93 vol % of a total pore volume and an inherent viscosity is 2.0 dl/g or greater is obtained.

20 Claims, 6 Drawing Sheets

U.S. PATENT DOCUMENTS

| | | |
|---|---|---|
| 2008/0071045 A1 | 3/2008 | Kawakami et al. |
| 2009/0203864 A1* | 8/2009 | Amin-Sanayei ............. 526/216 |

FOREIGN PATENT DOCUMENTS

| | | | |
|---|---|---|---|
| EP | 0423097 A1 | | 4/1991 |
| EP | 0554931 A1 | | 8/1993 |
| EP | 2196479 | * | 6/2010 |
| GB | 1293650 | * | 10/1972 |
| JP | 48-17388 | | 5/1973 |
| JP | 59-174605 A | | 10/1984 |
| JP | 6-73135 A | | 3/1994 |
| JP | 9-289023 A | | 11/1997 |
| JP | 3703582 B2 | | 7/2005 |
| JP | 2005-310747 A | | 11/2005 |
| WO | 98/49737 A1 | | 11/1998 |
| WO | 2006/061988 A1 | | 6/2006 |

OTHER PUBLICATIONS

International Search Report for PCT/JP2008/066927 mailed Dec. 9, 2008 with English translation.

* cited by examiner

VINYLIDENE FLUORIDE BASED POLYMER POWDER AND USE THEREOF

CROSS REFERENCE TO RELATED APPLICATIONS

This is a U.S. national stage application of International Application No. PCT/JP2008/066927, filed on 12 Sep. 2008. Priority under 35 U.S.C. §119(a) and 35 U.S.C. §365(b) is claimed from Japanese Application No. JP2007-265228, filed 11 Oct. 2007, the disclosure of which is also incorporated herein by reference.

TECHNICAL FIELD

The present invention relates to a vinylidene fluoride based polymer powder for use in a binder solution that is used to form an electrode of a nonaqueous cell such as a lithium cell, and use thereof.

BACKGROUND ART

A vinylidene fluoride based polymer is a crystalline polymer, and as having excellent mechanical strength, it is used in various articles. When a vinylidene fluoride based polymer is used as a binder solution for forming an electrode of a non-aqueous cell such as a lithium cell, the solubility of the polymer becomes an issue. For example, when a non-uniform solution in which a vinylidene fluoride based polymer is not completely dissolved is used as a binder for forming an electrode of a nonaqueous cell, powder electrode materials (powder materials such as an electrode active material and a conductive auxiliary agent) cannot be bound sufficiently and, furthermore, when a mixture of the powder electrode materials and a binder is applied to a charge collector, protrusions and depressions are formed to make it impossible to form a flat surface.

In cases of using a vinylidene fluoride based polymer as a binder for cells, those having an inherent viscosity of greater than 2.0 dl/g are excellent in binding capacity and the like (Patent Publication 2). An inherent viscosity is an alternate index of a molecular weight (degree of polymerization) of a polymer. The solubility of a polymer powder in an organic solvent decreases with increasing inherent viscosity to take time to dissolve.

Conventionally, a "good" solvent having adequate dissolving power with respect to a vinylidene fluoride based polymer is selected and the mixture is stirred with heating, as necessary, to prepare a uniform solution. However, since the vinylidene fluoride based polymer powders are aggregated during the stirring to form ball-like lumps that hinder the solvent to permeate into aggregate resin, it requires a long time to completely dissolve the powders to obtain a uniform solution. This tendency is stronger in a vinylidene fluoride based polymer with a higher degree of polymerization, which is useful as a binder for an electrode of a nonaqueous cell. For example, stirring for a long period of time of 2 days at 70° C. is required to prepare a solution with a concentration of 10% by weight by dissolving in N-methyl-2-pyrrolidone a vinylidene fluoride based polymer having an inherent viscosity (a logarithmic viscosity at 30° C. of a solution in which 4 g of resin is dissolved in 1 liter of N,N-dimethylformamide) of 2.1 dl/g. It may be a possible way to introduce a vinylidene fluoride based polymer by extremely small amounts to prevent formation of ball-like lumps, but this is not practical in view of workability and low efficiency.

The low solubility of vinylidene fluoride based polymers is attributed to dense surfaces of vinylidene fluoride based polymer powder particles that make it difficult for an organic solvent to permeate into inside the powder particles. Solution polymerization, emulsion polymerization, and suspension polymerization are known as methods for preparation of vinylidene fluoride based polymers. Solution polymerization is normally carried out at a polymerization temperature of 20° C. to 80° C. and a relatively low pressure (for example, 1.5 MPa or below), and is employed in production of relatively low-molecular-weight (for example, a number average molecular weight of 100,000 or below) vinylidene fluoride based polymers for use in paint. Emulsion polymerization is carried out using a chemically stable fluorine based emulsifier and a buffer to obtain a latex product with a small particle size of 0.1 µm to 1 µm, and the latex product is precipitated with an aggregating agent or the like and then subjected to granulation treatment and then formed into powder particles. Emulsion polymerization has disadvantages of complicated operations and high cost, because it requires use of an expensive emulsifier, separation of powder by aggregation/precipitation operations, removal of ionic substances contained in a aggregating agent, and so on. Suspension polymerization is a method that came into use since polymerization at a temperature of 30.1° C. (critical temperature of vinylidene fluoride monomer) or lower became possible as a result of development of an initiator capable of initiation at low temperatures. Vinylidene fluoride monomers, either alone or in combination with a copolymerizable monomer, are dispersed in water by use of a suspension agent to produce monomer droplets, and polymerization is developed in the presence of a polymerization initiator soluble in the droplets. The present Applicant proposed a suspension polymerization method comprising supplying a monomer dominantly comprising vinylidene fluoride first at a pressure below a critical pressure Pcr of vinylidene fluoride and then supplying at a pressure of at least Pcr (Patent Publication 1). In such a method of suspension polymerization with batch supply, an excess pressure increase in a polymerization system can be inhibited, and the resulting vinylidene fluoride based polymer has coloring resistance at a high-temperature, which is important for an appearance of a melt molded article.

However, vinylidene fluoride based polymers obtainable by the foregoing improved polymerization methods are used mainly to obtain a melt molded article having an inherent viscosity of 1.5 dl/g or below, and a problem regarding the solubility of the resulting polymers in an organic solvent and a solution to such a problem are not discussed.

Further, Patent Publication 1 discloses as a comparative example a polymerization example in which no additional monomer dominantly comprising vinylidene fluoride was added, but an inherent viscosity of the polymer obtained by this polymerization method was 1.1 dl/g. No vinylidene fluoride based polymer powder having an inherent viscosity of 2.0 dl/g or greater and excellent solubility was known in the past.

Patent Publication 1: WO 2006/061988
Patent Publication 2: Japanese patent No. 3703582

DISCLOSURE OF THE INVENTION

Problem to be Solved by the Invention

An object of the present invention is to provide a vinylidene fluoride based polymer powder with a high degree of polymerization which is useful as an electrode binder for a non-aqueous cell and has excellent solubility in an organic solvent and, as a use thereof, a method for the production of a cell binder and a cell electrode mixture using such a powder.

Means for Solving the Problem

The present inventors found that a vinylidene fluoride based polymer powder with a volume of pores having a pore diameter of 0.03 µm to 1.0 µm, as measured by a mercury porosimeter, of 77 vol % to 93 vol % with respect to a total pore volume and an inherent viscosity of 2.0 dl/g to 5.0 dl/g has excellent solubility in an organic solvent.

Specifically, the present invention provides a vinylidene fluoride based polymer powder characterized in that a volume of pores having a pore diameter of 0.03 µm to 1.0 µm, as measured by a mercury porosimeter, is 77 vol % to 93 vol %, preferably 82 vol % to 90 vol %, of a total pore volume, and an inherent viscosity (logarithmic viscosity at 30° C. of a solution comprising 4 g of polymer powder dissolved in 1 liter of N,N-dimethylformamide) is 2.0 dl/g to 5.0 dl/g, preferably 2.0 dl/g to 4.0 dl/g, more preferably 2.1 dl/g to 3.5 dl/g.

Preferably, a vinylidene fluoride based polymer powder of the present invention has (a volume of pores of 0.03 µm to 1.0 µm and an inherent viscosity within the above range) a volume of pores having a pore diameter of 0.003 µm to 1.0 µm, as measured by a mercury porosimeter, of 85 vol % or greater, preferably 89 vol % or greater, more preferably 93 vol % or greater, with respect to a total pore volume.

Preferably, a vinylidene fluoride based polymer powder of the present invention has a total pore volume of 1.7 ml/g to 2.2 ml/g, preferably 1.8 ml/g to 2.1 ml/g, more preferably 1.8 ml/g to 2.0 ml/g, as measured by a mercury porosimeter.

Preferably, a vinylidene fluoride based polymer powder of the present invention has a powder bulk density of 0.20 g/ml to 0.30 g/ml, preferably 0.22 g/ml to 0.27 g/ml, more preferably 0.23 g/ml to 0.25 g/ml. A vinylidene fluoride polymer normally has a density of 1.78 g/ml. At a temperature below a critical temperature of a vinylidene fluoride monomer, the vinylidene fluoride monomer exists in the form of droplets and has a density of about 0.7 g/ml. When a vinylidene fluoride monomer is in a supercritical state, the vinylidene fluoride monomer exists in the form of droplets but has a density of 0.4 g/ml, which is about ½ comparing with the case of below a critical temperature. A polymer obtained by suspension polymerization in a supercritical state has an inner bulk density of 0.4/1.78=about 0.23 g/ml. In suspended particles of the droplets, pores are formed as a polymer with a high density is produced. It is considered that when suspension polymerization is carried out in a supercritical state, since the density of monomers in the system is low, particles with a higher degree of porosity are formed. It is considered that as the degree of porosity of the particles increases, i.e., as an inner pore volume of particles of a suspension polymer increases, and as pores are also formed in a surface of the particles, permeability of a solvent into the particle pores increases to thereby increase the solubility of the resulting powder in an organic solvent.

When 2 parts by weight of a vinylidene fluoride based polymer powder of the present invention is introduced into 70 parts by weight of N-methyl-2-pyrrolidone at a room temperature, the powder dissolves within 260 seconds, preferably 200 seconds.

The present invention further provides a supercritical suspension polymerization method for producing the foregoing vinylidene fluoride based polymer powders, comprising: a suspension step of adding a vinylidene fluoride monomer, a suspension agent, a chain transfer agent, and a polymerization initiator to an aqueous dispersion medium, followed by stirring to form a suspended particulate monomer droplet having a diameter of about 200 µm; and a supercritical polymerization step of polymerizing a suspension containing the suspended particulate monomer droplet at a temperature above 30.1° C. and a pressure greater than 4.38 MPa.

Preferably, a vinylidene fluoride based polymer powder of the present invention is obtained by the supercritical suspension polymerization described above. Emulsion polymerization is not preferred, because to recover a polymer from an emulsion after polymerization, the polymer is precipitated with a aggregating agent or the like and subjected to granulation treatment and then formed into powder particles, or the emulsion is sprayed to evaporate an aqueous medium, so that an inner structure of particles is strongly affected by a subsequent step for the recovery of the particles, rather than the forming of the particles by polymerization.

Preferably, a maximum temperature in the supercritical polymerization step is in the range of 31° C. to 100° C., preferably in the range of 45° C. to 65° C. A length of time from 10° C. to the maximum temperature may be any length within an extent that a polymerization initiator does not decompose to lose activity. Preferably, the length of time is set to preferably 30 minutes to 300 minutes, more preferably 150 minutes to 180 minutes.

Preferably, a maximum pressure in the supercritical polymerization step is in the range of 4.4 MPa to 12 MPa, more preferably in the range of 6.0 MPa to 8.0 MPa. In the supercritical polymerization step, when a temperature of a suspension is elevated in a pressurized vessel in accordance with a temperature elevation profile until the predetermined maximum temperature and the predetermined maximum pressure are reached and then polymerization is continued at a predetermined temperature, the pressure in the system decreases as the polymerization of vinylidene fluoride monomers is developed. In view of the polymer yield, termination of the polymerization is preferably at a point when at least 70% of the polymerization of introduced monomers is completed. Specifically, the polymerization is terminated when, for example, the pressure in the system is reduced to 2.5 MPa or below, and unreacted monomer gas is discharged and the polymer slurry is withdrawn, dehydrated, washed with water, dehydrated and then dried.

Vinylidene fluoride monomers to be used in a supercritical suspension polymerization method of the present invention include a homopolymer of vinylidene fluoride and a copolymer comprising vinylidene fluoride as a main component, preferably 50% by weight or greater, more preferably 65% by weight or greater, of vinylidene fluoride, and a copolymerizable monomer with vinylidene fluoride. Examples of preferred monomers copolymerizable with vinylidene fluoride include vinyl fluoride, trifluoroethylene, tetrafluoroethylene, chlorotrifluoroethylene, hexafluoropropylene, perfluoroalkylvinyl ether, ethylene, monomethyl maleate, and allyl glycidyl ether, but the copolymerizable monomer is not limited to these monomers.

A polymerization initiator to be used in a supercritical suspension polymerization method of the present invention is a polymerization initiator with a ten-hour half-life temperature $T_{10}$ of about 30.1° C. to 90° C., which is a critical temperature of vinylidene fluoride. Examples include diisopropylperoxydicarbonate ($T_{10}$=40.5° C.), dinormalpropylperoxydicarbonate ($T_{10}$=40.3° C.) and tert-butylperoxyprivalate ($T_{10}$=54.6° C.).

Examples of preferred suspension agents to be used in a supercritical suspension polymerization method of the present invention include methylcellulose, hydroxyethylcellulose, hydroxypropylcellulose, hydroxypropylmethylcellulose, partially saponified polyvinyl acetate and acrylic acid based polymers.

Examples of preferred chain transfer agents to be used in a supercritical suspension polymerization method of the present invention include ethyl acetate, propyl acetate, acetone and diethyl carbonate. A chain transfer agent is used to adjust a molecular weight of a polymer to be obtained.

As a pH adjuster to inhibit corrosion, an alkali metal salt of phosphate, such as sodium pyrophosphate and acidic sodium pyrophosphate, may be added as necessary. These pH adjusters are effective for not only inhibition of corrosion in a device that is used but also stabilization of suspended polymerized particles, inhibition of combination of particles, and inhibition of polymerization of monomers in an aqueous phase.

In a supercritical suspension polymerization method of the present invention, preferably 100-500 parts by weight of an aqueous solvent, 0.001-2 parts by weight of a polymerization initiator, and 0.01-2 parts by weight of a suspension agent are added with respect to 100 parts by weight of a vinylidene fluoride monomer. To obtain an inherent viscosity of about 2 dl/g, in the cases of using a pH adjuster such as sodium pyrophosphate and acidic sodium pyrophosphate, preferably 1 part by weight or less of a pH adjuster is added with respect to 100 parts by weight of a vinylidene fluoride monomer and in the cases of using a chain transfer agent, preferably 5 parts by weight or less of a chain transfer agent is added with respect to 100 parts by weight of a vinylidene fluoride monomer. When the amount of an aqueous solvent is less than 100 parts by weight or greater than 500 parts by weight, formation of suspended polymerized particles becomes unstable to impair powder properties. When the amount of a polymerization initiator is greater than 0.5 parts by weight, low-molecular-weight components are readily formed during the polymerization reaction. Thus, when the resulting polymer is used as a binder for a cell, there may be components dissolving in a nonaqueous electrolytic solution to impair cell properties. When the amount of a suspension agent is outside the above range, suspended particles are not formed well to impair powder properties. When the amount of a chain transfer agent is greater than 5 parts by weight, the polymerization time is excessively prolonged due to the chain transfer action, or it is not possible to obtain a polymer with a desired molecular weight.

Note that a supercritical suspension polymerization method of the present invention is significantly different from a supercritical suspension polymerization method disclosed in Patent Publication 1 in that no additional monomer is subsequently added. An additionally added monomer is polymerized in voids in powder particles and clogs pores to thereby increase a powder bulk density; therefore, it is not possible to obtain a powder bulk density of 0.23 g/ml to 0.25 g/ml of a vinylidene fluoride based polymer powder of the present invention. The present invention and Comparative Example 1 of Patent Publication 1, in which no monomer is subsequently added, are significantly different in types and quantitative ratios of a polymerization initiator and a chain transfer agent, and a pore structure and an inherent viscosity of the resulting polymer powder (refer to Comparative Example 9 below). A relation between a mechanism of causing different pore structures and a polymerization process is not clear, but that is considered as a consequence of complex interactions of a combination of types and amounts of a polymerization initiator and a chain transfer agent and the presence of a pH adjuster, which is an auxiliary agent.

A polymer polymerized by a supercritical suspension polymerization method of the present invention is dehydrated with a centrifugal dewaterer, a press dewaterer or the like and then dried by a common method using a heated gas stream or pressure reduction to evaporate water content, and can be obtained as a vinylidene fluoride based polymer powder. The resulting vinylidene fluoride based polymer in the form of powder can be used directly as a cell binder. A solution type cell binder in which the vinylidene fluoride based polymer is dissolved in the foregoing organic solvent is also preferably used.

The present invention provides methods for producing a cell binder and a cell electrode mixture using the vinylidene fluoride based polymer powder having increased solubility in the foregoing organic solvent.

A specific method for producing a solution type cell binder comprises introducing the foregoing organic solvent into a dissolution tank equipped with a stirrer, gradually adding a polymer powder of the present invention with stirring, and continuously stirring at room temperature to dissolve the powder. A method in which after addition of powder, the mixture is brought into a heated state of about 30-70° C. and stirred continuously to dissolve the powder is also preferred. A polymer powder of the present invention is dissolved in an amount of 1-20 parts by weight, preferably 1.5-15 parts by weight, more preferably 2-10 parts by weight, with respect to 100 parts by weight of the organic solvent described above. A dissolution time varies according to stirring power of a dissolution tank and a polymer concentration, but while a polymer powder having an inherent viscosity of 2.0 dl/g or more normally requires 3 hours to 48 hours to dissolve, a polymer powder of the present invention can be dissolved in a shorter time under the same conditions, which is $\frac{1}{40}$-$\frac{1}{4}$ of the dissolution time of a polymer powder having an inherent viscosity of 2.0 dl/g or more.

A specific method of producing a cell electrode mixture comprises adding in a kneading stirrer (a stirrer such as a planetary mixer and a homogenizer) at least an active material of a positive or negative electrode and, a conductive auxiliary agent such as carbon black (if needed), a vinylidene fluoride polymer powder of the present invention, and N-methyl-2-pyrrolidone (hereinafter "NMP"), and adequately stirring and mixing the mixture to obtain a cell electrode mixture. NMP may be added to adjust a viscosity and a solid component concentration of the mixture slurry for coating. The mixture slurry thus prepared is preferred in view of coating properties on a charge collector and cell properties, because the polymer is dissolved in a short period of time and the powder of the active material or the conductive auxiliary agent is adequately dispersed.

EXAMPLES

Figure 1:
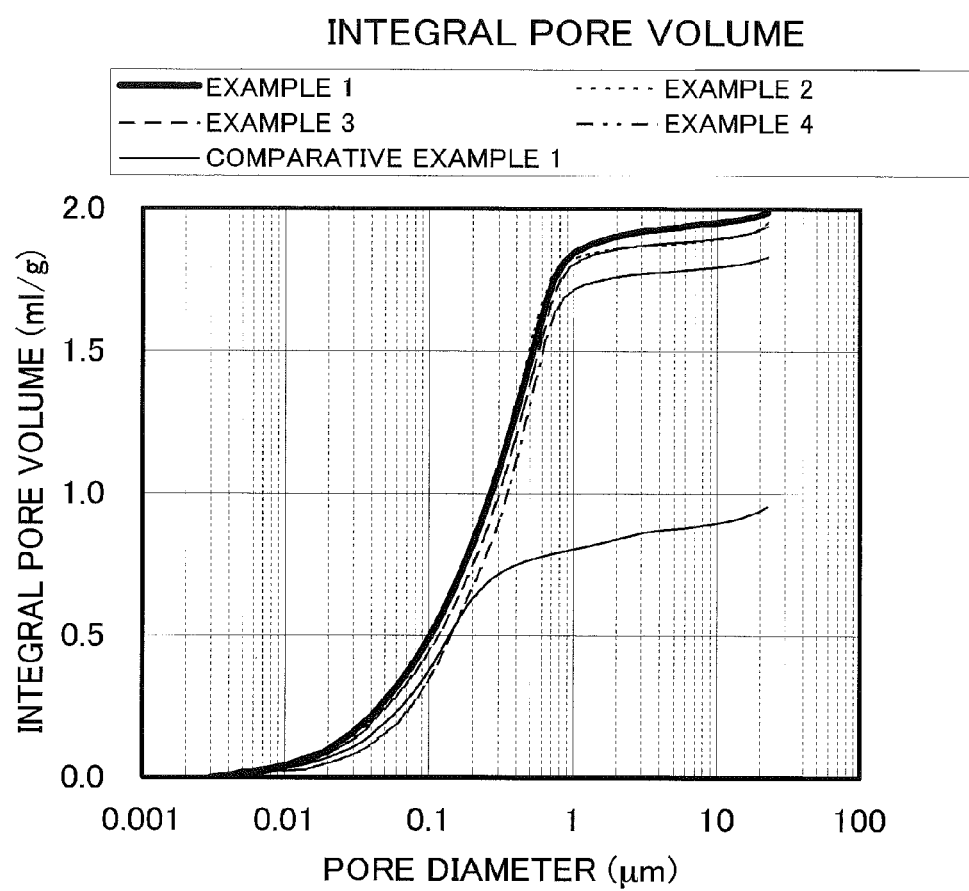
FIG. 1 is a graph showing integral pore volumes of vinylidene fluoride polymer powders of the present invention prepared in Examples 1-4 and in Comparative Example 1.

The present invention is described in more detail in the following non-limiting Examples.

In the following Examples, inherent viscosities are values obtained by adding 4 g of vinylidene fluoride based polymer to 1 L of N,N-dimethylformamide and dissolving it at 80° C. for 8 hours to prepare a solution, and determining a logarithmic viscosity with a Ubbelohde viscometer while maintaining the solution at 30° C.

Pore distributions of the resulting vinylidene fluoride polymer powders were determined by drying 0.3-0.4 g of a vinylidene fluoride polymer powder sample at 105° C. plus or minus 2° C. for 4 hours and then determining a pore distribution in the pore range of 3 nm to 22500 nm using "Auto pore 9520" (available from Micrometric) in accordance with JIS R1655 mercury porosimetry with a cell volume of 5 ml (cell for powder).

Preparation of Vinylidene Fluoride Based Polymer

Example 1

In an autoclave having an inner volume of 2 liters, 1040 g of ion-exchanged water, 0.4 g of methylcellulose, 400 g of vinylidene fluoride monomer, 0.32 g of tert-butylperoxyprivalate, 0.4 g of sodium pyrophosphate, 0.4 g of acidic sodium pyrophosphate and 2.0 g of diethyl carbonate were charged, and the mixture was stirred at 10° C. for 30 minutes and then warmed to 45° C. over 120 minutes. A maximum pressure in the autoclave reached 6.1 MPa. The polymerization was terminated when the pressure in the autoclave was reduced to 2.5 MPa, which was 14.25 hours after the initiation of the warming.

After the polymerization was completed, the polymer slurry was withdrawn, dehydrated, washed with water, dehydrated and then dried at 80° C. for 20 hours to obtain a vinylidene fluoride polymer powder having an inherent viscosity of 2.16 dl/g and a bulk density of 0.233 g/ml at a yield of 75.5%.

Example 2

The polymerization of Example 1 was repeated, except that 1.52 g of diethyl carbonate was used and the warming was from 10° C. to 55° C. over 180 minutes. A maximum pressure in the autoclave reached 7.1 MPa. The polymerization was terminated when the pressure in the autoclave was reduced to 2.5 MPa, which was 10.25 hours after the initiation of the warming.

After the polymerization was completed, the polymer slurry was withdrawn, dehydrated, washed with water, dehydrated and then dried at 80° C. for 20 hours to obtain a vinylidene fluoride polymer powder having an inherent viscosity of 2.27 dl/g and a bulk density of 0.236 g/ml at a yield of 84.5%.

Example 3

The polymerization of Example 1 was repeated, except that 0.28 g of tert-butylperoxyprivalate and 1.67 g of diethyl carbonate were used and the warming was from 10° C. to 60° C. over 180 minutes. A maximum pressure in the autoclave reached 7.7 MPa. The polymerization was terminated when the pressure in the autoclave was reduced to 2.5 MPa, which was 10.33 hours after the initiation of the warming.

After the polymerization was completed, the polymer slurry was withdrawn, dehydrated, washed with water, dehydrated and then dried at 80° C. for 20 hours to obtain a vinylidene fluoride polymer powder having an inherent viscosity of 2.18 dl/g and a bulk density of 0.238 g/ml at a yield of 85.5%.

Example 4

The polymerization of Example 1 was repeated, except that 0.60 g of perbutylperoxypivalate and 1.20 g of diethyl carbonate were used and the warming was from 10° C. to 65° C. over 180 minutes. A maximum pressure in the autoclave reached 7.9 MPa. The polymerization was terminated when the pressure in the autoclave was reduced to 2.5 MPa, which was 6.85 hours after the initiation of the warming.

After the polymerization was completed, the polymer slurry was withdrawn, dehydrated, washed with water, dehydrated and then dried at 80° C. for 20 hours to obtain a vinylidene fluoride polymer powder having an inherent viscosity of 2.33 dl/g and a bulk density of 0.246 g/ml at a yield of 84.5%.

Example 5

The polymerization of Example 1 was repeated, except that 0.26 g of tert-butylperoxyprivalate was used and no diethyl carbonate was used. A maximum pressure in the autoclave reached 6.7 MPa. The polymerization was terminated when the pressure in the autoclave was reduced to 2.5 MPa, which was 23.0 hours after the initiation of the warming.

After the polymerization was completed, the polymer slurry was withdrawn, dehydrated, washed with water, dehydrated and then dried at 80° C. for 20 hours to obtain a vinylidene fluoride polymer powder having an inherent viscosity of 3.46 dl/g and a bulk density of 0.250 g/ml was obtained at a yield of 85.0%.

Comparative Example 1

This Comparative Example was the preparation of a vinylidene fluoride polymer powder by a common suspension polymerization method.

In an autoclave having an inner volume of 2 liters, 1040 g of ion-exchanged water, 0.4 g of methylcellulose, 400 g of vinylidene fluoride monomer, 2.5 g of diisopropylperoxy dicarbonate and 5.0 g of ethyl acetate were charged, and suspension polymerization was carried out at 26° C. for 20 hours.

After the polymerization was completed, the polymer slurry was withdrawn, dehydrated, washed with water, dehydrated and then dried at 80° C. for 20 hours to obtain a vinylidene fluoride polymer powder having an inherent viscosity of 2.10 dl/g and a bulk density of 0.430 g/ml at a yield of 91%.

Comparative Example 2

This Comparative Example was the preparation of a vinylidene fluoride polymer powder by a common suspension polymerization method.

In an autoclave having an inner volume of 2 liters, 1040 g of ion-exchanged water, 0.4 g of methylcellulose, 400 g of vinylidene fluoride monomer, 2.0 g of normalpropylperoxy dicarbonate and 8.0 g of ethyl acetate were charged, and suspension polymerization was carried out at 25° C. for 13 hours.

After the polymerization was completed, the polymer slurry was withdrawn, dehydrated, washed with water, dehydrated and then dried at 80° C. for 20 hours to obtain a vinylidene fluoride polymer powder having an inherent viscosity of 1.10 dl/g and a bulk density of 0.426 g/ml at a yield of 91%.

As Comparative Examples 3-8, inherent viscosities and bulk densities of commercially-available vinylidene fluoride polymer powders were determined.

Comparative Example 3

"Solef 6020" (manufactured by Solvay Solexis) prepared by suspension polymerization was used.

Comparative Example 4

"Kynar HSV900" (manufactured by ARKEMA) was used.

Comparative Example 5

"KF polymer #1300" (manufactured by Kureha Corporation) prepared by suspension polymerization was used.

Comparative Example 6

"Solef 6010" (manufactured by Solvay Solexis) was used.

Comparative Example 7

"Solef 1010" (manufactured by Solvay Solexis) prepared by suspension polymerization was used.

Comparative Example 8

"Kynar 761" (manufactured by ARKEMA) prepared by emulsion polymerization was used.

Comparative Example 9

This Comparative Example was the preparation of a vinylidene fluoride monomer powder by the supercritical suspension polymerization disclosed in Patent Publication 1, Comparative Example 1.

In an autoclave having an inner volume of 2 liters, 1040 g of ion-exchanged water, 0.2 g of methylcellulose, 400 g of vinylidene fluoride monomer, 0.40 g of diisopropylperoxy dicarbonate and 7.2 g of ethyl acetate were charged, and the mixture was stirred at 10° C. for 30 minutes and then warmed to 60° C. over 144 minutes. A maximum pressure in the autoclave reached 7.1 MPa. The polymerization was terminated when the pressure in the autoclave was reduced to 2.0 MPa, which was 5.75 hours after the initiation of the warming.

After the polymerization was completed, the polymer slurry was withdrawn, dehydrated, washed with water, dehydrated and then dried at 80° C. for 20 hours to obtain a vinylidene fluoride polymer powder having an inherent viscosity of 1.11 dl/g and a bulk density of 0.238 g/ml at a yield of 89%.

The inherent viscosities and bulk densities determined in Examples 1-5 and Comparative Examples 1-9 are summarized in Table 1.

The pore distributions determined in Examples 1-5 and Comparative Examples 1-9 are shown in Table 2.

Figure 2:
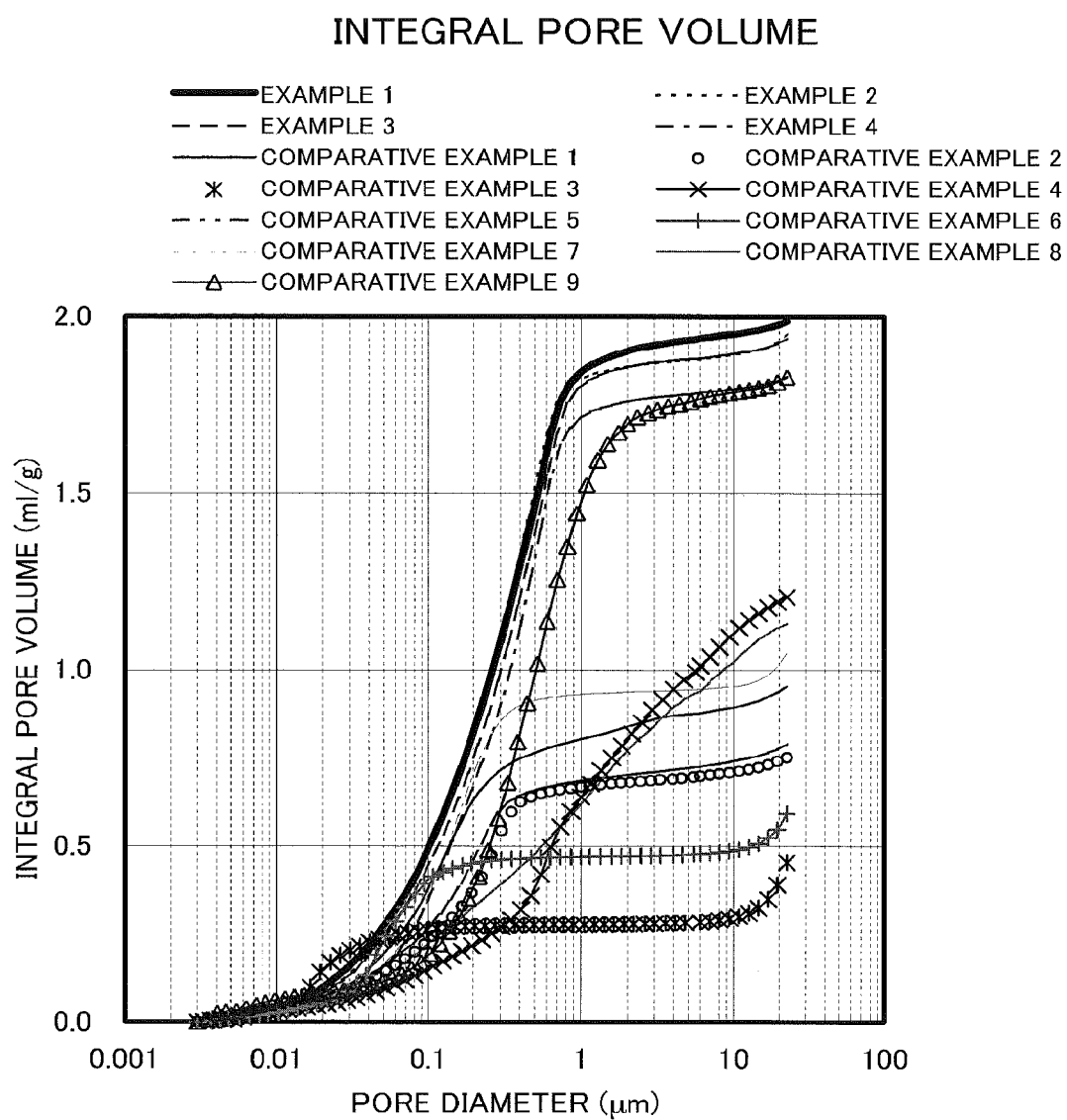
FIG. 2 is a graph showing integral pore volume distributions (ml/g) of vinylidene fluoride polymer powders of Examples 1-4 and Comparative Examples 1-9.
Figure 3:
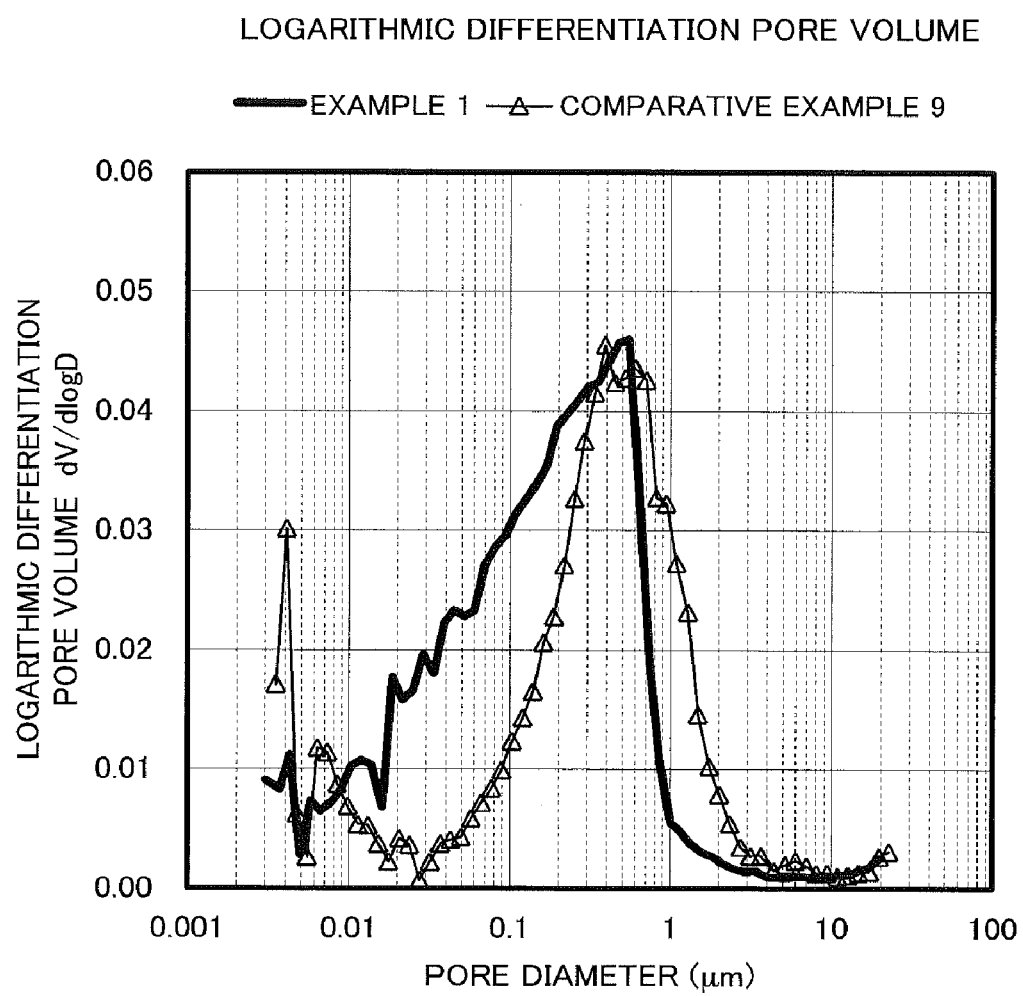
FIG. 3 is a graph showing logarithmic differentiation pore volume distributions (mg/l) of vinylidene fluoride polymer powders of Example 1 and Comparative Example 9.

Graphs illustrating the results obtained in Examples 1-4 and Comparative Examples 1-9 are shown in FIGS. 1-3.

<Solubility of Vinylidene Fluoride Polymer Powder>

Figure 4:
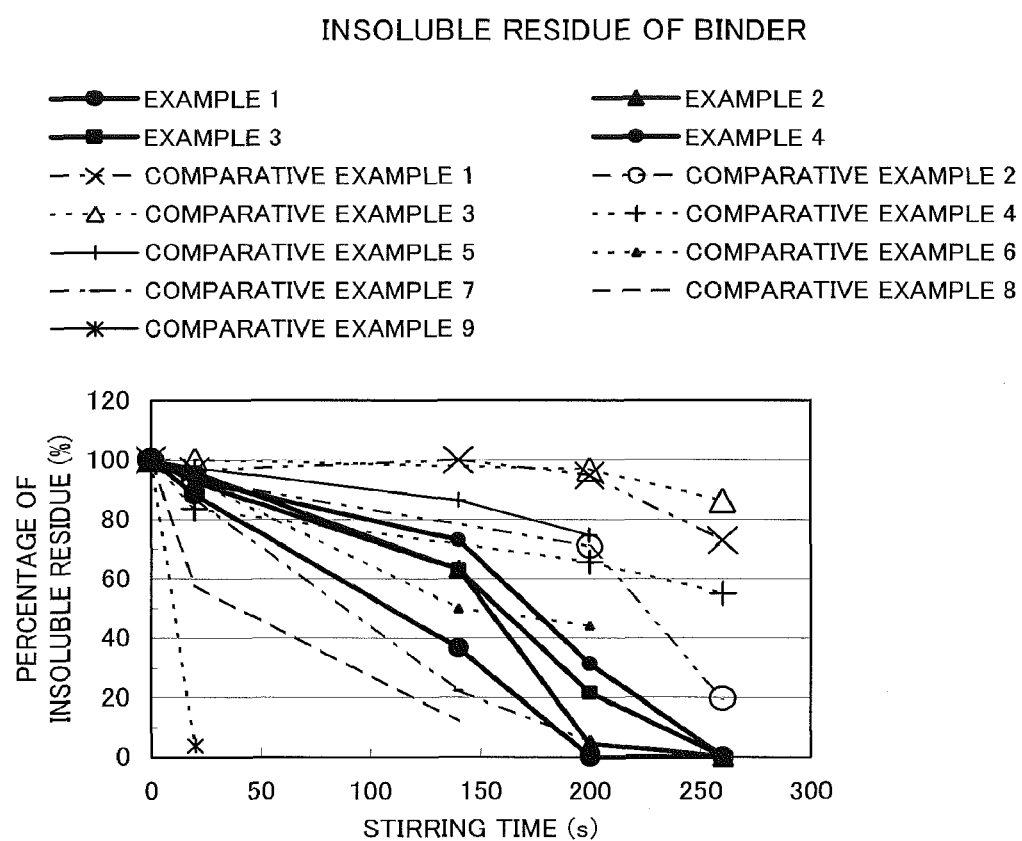
FIG. 4 is a graph showing solubilities of vinylidene fluoride polymer powders of Examples 1-4 and Comparative Examples 1-9 in comparison.

Seventy grams of N-methyl-2-pyrrolidone was charged into a mixing stirrer "Awatorirentaro MX201" (manufactured by THINKY), and the temperature was set to 26° C. Then, 2 g of vinylidene fluoride polymer powders of Examples 1-4 and Comparative Examples 1-9 were added at once, covered with a lid, and mixed by stirring with a stirrer for 3 minutes (180 seconds). Insoluble residues were recovered with a 15-mesh wire net at time points of 0 second, 20 seconds, 140 seconds, 200 seconds and 260 seconds after the initiation of the stirring. The recovered insoluble residues were dried at 130° C. for 4 hours and then weighted out to determine insoluble residue percentages (%). The insoluble residue percentages were determined by the formula (dry mass of insoluble residues)/(initial amount of introduced powder)× 100. The results are collectively shown in Table 1 and FIG. 4.

TABLE 1

Comparison of inherent viscosities, bulk densities and insoluble residue percentages

| Sample | Inherent viscosity (dl/g) | Powder bulk density (g/ml) | Insoluble residue percentage (%) Stirring time (seconds) | | | | |
|---|---|---|---|---|---|---|---|
| | | | 0 | 20 | 140 | 200 | 260 |
| Example 1 | 2.16 | 0.233 | 100 | 88.3 | 36.6 | 0 | 0 |
| Example 2 | 2.27 | 0.236 | 100 | 92.5 | 63.1 | 4.3 | 0 |
| Example 3 | 2.18 | 0.238 | 100 | 95.7 | 63.0 | 21.7 | 0 |
| Example 4 | 2.33 | 0.246 | 100 | 93.2 | 73.0 | 31.4 | 0 |
| Example 5 | 3.46 | 0.250 | 100 | 95.1 | 76.3 | 32.6 | 0 |
| Comparative Example 1 | 2.10 | 0.430 | 100 | 96.4 | 95.3 | 94.7 | 72.9 |
| Comparative Example 2 | 1.10 | 0.426 | 100 | 93.2 | — | 70.8 | 19.6 |
| Comparative Example 3 | 1.88 | 0.560 | 100 | 100 | — | 96.7 | 86.2 |
| Comparative Example 4 | 1.71 | 0.331 | 100 | 83.6 | — | 65.6 | 54.9 |
| Comparative Example 5 | 1.30 | 0.423 | 100 | 97.2 | 86.3 | 74.5 | — |
| Comparative Example 6 | 1.03 | 0.542 | 100 | 93.2 | 50.0 | 44.2 | — |
| Comparative Example 7 | 1.03 | 0.556 | 100 | 87.2 | 22.3 | 5.0 | — |
| Comparative Example 8 | 1.13 | 0.338 | 100 | 57.6 | 12.1 | — | — |
| Comparative Example 9 | 1.11 | 0.238 | 100 | 3.7 | — | — | — |

* "—" indicates that no determination was conducted.

It can be understood from Table 1 that although the vinylidene fluoride polymer powders of the present invention had a high molecular weight and an inherent viscosity of greater than 2.0 dl/g, they had excellent solubility in N-methyl-2-pyrrolidone.

TABLE 2

Pore distributions measured by mercury porosimeter

| Sample | Total pore Volume V (ml/g) | Integral volume V1 (ml/g) of pores with a diameter of 0.3-1 μm | Percentage of integral volume of pores with a diameter of 0.3-1 μm V1/V × 100 (vol %) | Integral volume V2 (ml/g) of pores with a diameter of 0.03-1 μm | Percentage of integral volume of pores with a diameter of 0.03-1 μm V2/V × 100 (vol %) | Integral volume V3 (ml/g) of pores with a diameter of 0.003-1 μm | Percentage of integral volume of pores with a diameter of 0.003-1 μm V3/V × 100 (vol %) |
|---|---|---|---|---|---|---|---|
| Example 1 | 1.9864 | 0.753 | 37.9 | 1.684 | 84.8 | 1.844 | 93.2 |
| Example 2 | 1.9515 | 0.723 | 37.1 | 1.683 | 86.2 | 1.825 | 93.7 |
| Example 3 | 1.9386 | 0.800 | 41.3 | 1.669 | 86.1 | 1.803 | 93.7 |
| Example 4 | 1.8309 | 0.870 | 44.1 | 1.633 | 89.2 | 1.714 | 93.9 |
| Example 5 | 1.8273 | 0.891 | 48.8 | 1.615 | 88.4 | 1.701 | 93.1 |
| Comparative Example 1 | 0.9531 | 0.086 | 9.0 | 0.695 | 72.9 | 0.803 | 84.5 |
| Comparative Example 2 | 0.7518 | 0.125 | 16.6 | 0.575 | 76.5 | 0.668 | 88.9 |
| Comparative Example 3 | 0.7901 | 0.081 | 10.2 | 0.585 | 74.0 | 0.668 | 88.9 |
| Comparative Example 4 | 0.4541 | 0.002 | 0.5 | 0.073 | 16.1 | 0.277 | 61.1 |
| Comparative Example 5 | 1.2068 | 0.370 | 30.6 | 0.577 | 47.8 | 0.640 | 53.0 |
| Comparative Example 6 | 0.5928 | 0.008 | 1.4 | 0.375 | 63.3 | 0.469 | 79.2 |
| Comparative Example 7 | 1.0497 | 0.072 | 6.9 | 0.845 | 80.5 | 0.931 | 88.7 |
| Comparative Example 8 | 1.1314 | 0.228 | 20.2 | 0.561 | 49.5 | 0.622 | 54.9 |
| Comparative Example 9 | 1.828 | 0.871 | 47.6 | 1.387 | 75.8 | 1.480 | 80.9 |

<Preparation of Mixtures for Lithium Nonaqueous Cell Electrode and Evaluation of Solubility of Vinylidene Fluoride Polymer Powders>

Two hundred grams of lithium cobaltate ("Cellseed C-8G" (manufactured by Nippon Chemical Industrial Co., Ltd.)) and 4.17 g of conductive carbon black ("DENKA BLACK" (manufactured by Denki Kagaku Kogyo Kabushiki Kaisha)) were charged into a kneading stirrer planetary mixer "T.K. HIVIS MIX f model 03" (manufactured by PRIMIX Corporation) for use in preparation of mixture, and the powders were mixed at 50 rpm for 10 minutes. Then, 4.17 g of the vinylidene fluoride polymer powder that was prepared in Example 1 and 138.89 g of N-methyl-2-pyrrolidone were added, and the mixture was mixed by stirring at 50 rpm for 10 minutes. The solid component concentration was 60%. This mixture was introduced into a mixing stirrer "Awatorirentaro MX201" (manufactured by THINKY) and subjected to defoaming treatment for 10 seconds to obtain a mixture for evaluation. This mixture was visually observed. Mixtures for evaluation were also prepared using the products of Comparative Examples 1-4 and visually observed. The observation photographs thereof are shown in FIG. 5.

Figure 5A:
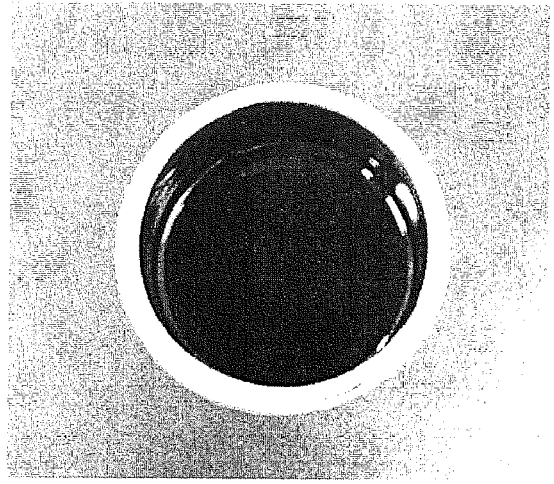
FIG. 5(A) to FIG. 5(E) are visual observation photographs of solubilities of mixtures for use in electrodes using vinylidene fluoride polymer powders of Example 1 and Comparative Examples 1-4.
Figure 5B:
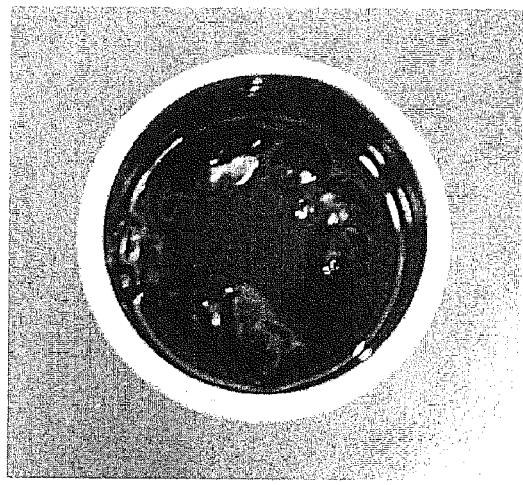
Figure 5C:
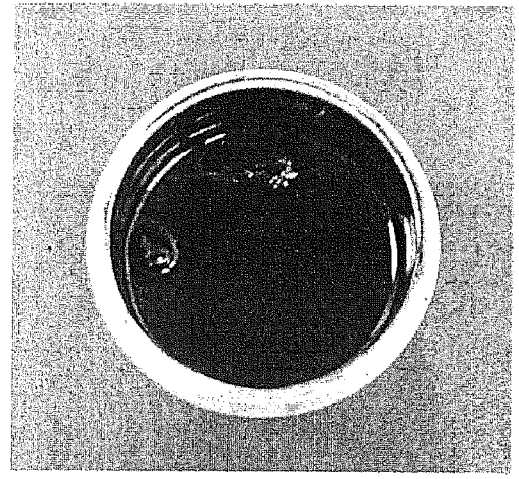
Figure 5D:
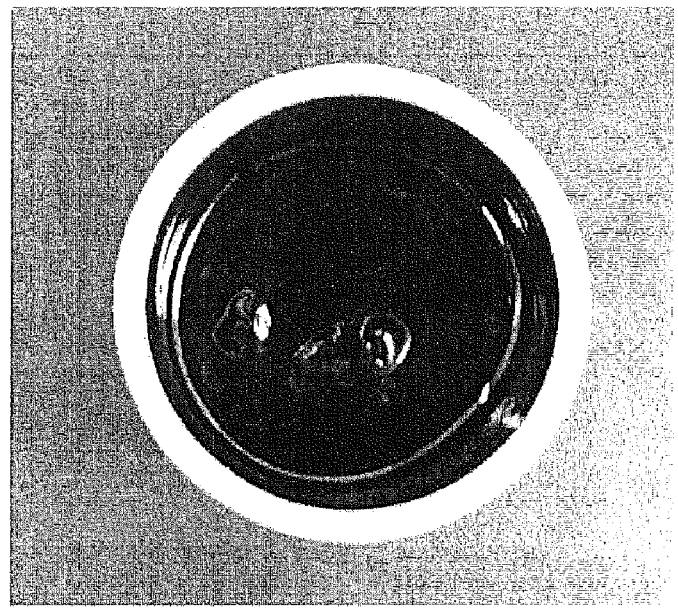
Figure 5E:
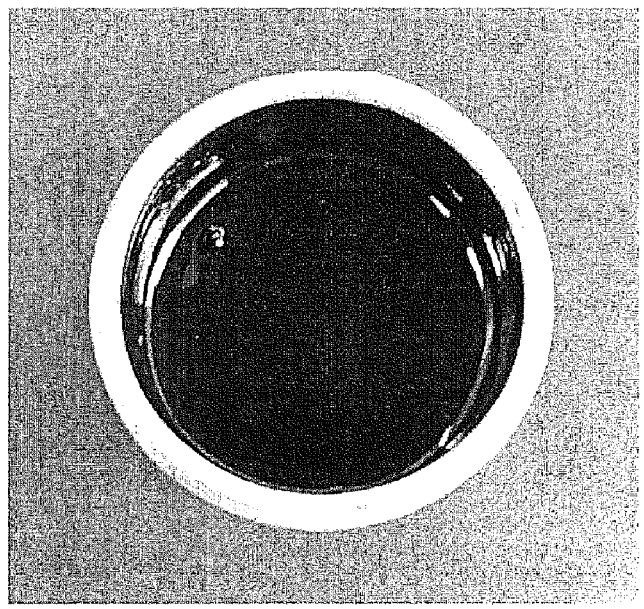

FIG. 5(A) is an observation photograph of Example 1. FIG. 5(B) is an observation photograph of Comparative Example 1. FIG. 5(C) is an observation photograph of Comparative Example 2. FIG. 5(D) is an observation photograph of Comparative Example 3. FIG. 5(E) is an observation photograph of Comparative Example 4. FIG. 5(A) indicates a uniform dissolution state. FIG. 5(B) indicates that large ball-like lumps of insoluble residues were observed. FIG. 5(C) indicates that several ball-like lumps of insoluble residues were observed. FIG. 5(D) indicates that large ball-like lumps of insoluble residues were observed. FIG. 5(E) indicates that small ball-like lumps of insoluble residues were observed. It is obvious from these observation photographs that while the vinylidene fluoride polymer powder of the present invention was completely dissolved to form a uniform solution, ball-like lumps were present in the cases of Comparative Examples 1-4 to indicate that the dissolution was incomplete and a uniform solution was not obtained.

The invention claimed is:

1. A vinylidene fluoride based polymer powder, wherein:
    a volume of pores having a pore diameter of 0.03 μm to 1.0 μm, as measured by a mercury porosimeter, is 77 vol % to 93 vol % of a total pore volume; and
    an inherent viscosity (logarithmic viscosity at 30° C. of a solution comprising 4 g of polymer powder dissolved in 1 liter of N,N-dimethylformamide) is 2.0 dl/g to 5.0 dl/g.

2. A supercritical suspension polymerization method for producing the vinylidene fluoride based polymer powder of claim 1, comprising:
    a suspension step of adding a vinylidene fluoride monomer, and at least a suspension agent, a chain transfer agent, and a polymerization initiator to an aqueous dispersion medium and stirring the mixture to form a suspended particulate monomer droplet having a diameter of about 200 μm; and
    a supercritical polymerization step of polymerizing a suspension containing the suspended particulate monomer droplet at a temperature higher than 30.1° C. and a pressure greater than 4.38 MPa.

3. A method for producing a binder for a cell, comprising dissolving the vinylidene fluoride based polymer powder of claim 1 in an organic solvent.

4. A method for producing an electrode mixture for a cell, comprising mixing an electrode active material, the vinylidene fluoride based polymer powder of claim 1, and an organic solvent to produce a paste of the mixture.

5. The vinylidene fluoride based polymer powder of claim 1, wherein a volume of pores having a pore diameter of 0.003 µm to 1.0 µm, as measured by a mercury porosimeter, is 85 vol % or greater.

6. A supercritical suspension polymerization method for producing the vinylidene fluoride based polymer powder of claim 5, comprising:
   a suspension step of adding a vinylidene fluoride monomer, and at least a suspension agent, a chain transfer agent, and a polymerization initiator to an aqueous dispersion medium and stirring the mixture to form a suspended particulate monomer droplet having a diameter of about 200 µm; and
   a supercritical polymerization step of polymerizing a suspension containing the suspended particulate monomer droplet at a temperature higher than 30.1° C. and a pressure greater than 4.38 MPa.

7. A method for producing a binder for a cell, comprising dissolving the vinylidene fluoride based polymer powder of claim 5 in an organic solvent.

8. A method for producing an electrode mixture for a cell, comprising mixing an electrode active material, the vinylidene fluoride based polymer powder of claim 5, and an organic solvent to produce a paste of the mixture.

9. The vinylidene fluoride based polymer powder of claim 1, wherein the total pore volume is 1.7 ml/g to 2.2 ml/g, as measured by the mercury porosimeter.

10. A supercritical suspension polymerization method for producing the vinylidene fluoride based polymer powder of claim 9, comprising:
    a suspension step of adding a vinylidene fluoride monomer, and at least a suspension agent, a chain transfer agent, and a polymerization initiator to an aqueous dispersion medium and stirring the mixture to form a suspended particulate monomer droplet having a diameter of about 200 µm; and
    a supercritical polymerization step of polymerizing a suspension containing the suspended particulate monomer droplet at a temperature higher than 30.1° C. and a pressure greater than 4.38 MPa.

11. A method for producing a binder for a cell, comprising dissolving the vinylidene fluoride based polymer powder of claim 9 in an organic solvent.

12. A method for producing an electrode mixture for a cell, comprising mixing an electrode active material, the vinylidene fluoride based polymer powder of claim 9, and an organic solvent to produce a paste of the mixture.

13. The vinylidene fluoride based polymer powder of claim 1 having a powder bulk density of from 0.20 g/ml to 0.30 g/ml.

14. A supercritical suspension polymerization method for producing the vinylidene fluoride based polymer powder of claim 13, comprising:
    a suspension step of adding a vinylidene fluoride monomer, and at least a suspension agent, a chain transfer agent, and a polymerization initiator to an aqueous dispersion medium and stirring the mixture to form a suspended particulate monomer droplet having a diameter of about 200 µm; and
    a supercritical polymerization step of polymerizing a suspension containing the suspended particulate monomer droplet at a temperature higher than 30.1° C. and a pressure greater than 4.38 MPa.

15. A method for producing a binder for a cell, comprising dissolving the vinylidene fluoride based polymer powder of claim 13 in an organic solvent.

16. A method for producing an electrode mixture for a cell, comprising mixing an electrode active material, the vinylidene fluoride based polymer powder of claim 13, and an organic solvent to produce a paste of the mixture.

17. The vinylidene fluoride based polymer powder of claim 1, wherein when 2 parts by weight of the powder is introduced in 70 parts by weight of N-methyl-2-pyrrolidone at a room temperature, the powder dissolves within 260 seconds.

18. A supercritical suspension polymerization method for producing the vinylidene fluoride based polymer powder of claim 17, comprising:
    a suspension step of adding a vinylidene fluoride monomer, and at least a suspension agent, a chain transfer agent, and a polymerization initiator to an aqueous dispersion medium and stirring the mixture to form a suspended particulate monomer droplet having a diameter of about 200 µm; and
    a supercritical polymerization step of polymerizing a suspension containing the suspended particulate monomer droplet at a temperature higher than 30.1° C. and a pressure greater than 4.38 MPa.

19. A method for producing a binder for a cell, comprising dissolving the vinylidene fluoride based polymer powder of claim 17 in an organic solvent.

20. A method for producing an electrode mixture for a cell, comprising mixing an electrode active material, the vinylidene fluoride based polymer powder of claim 17, and an organic solvent to produce a paste of the mixture.

* * * * *